United States Patent
Reydet et al.

(10) Patent No.: US 10,189,120 B2
(45) Date of Patent: Jan. 29, 2019

(54) WELDING WIRE FOR FE—36NI ALLOY

(71) Applicant: APERAM, Luxembourg (LU)

(72) Inventors: Pierre-Louis Reydet, Coulanges les Nevers (FR); Jean-Louis Roy, Chaussy (FR); Roland André Panier, Nevers (FR)

(73) Assignee: APERAM, Luxembourg (LU)

( * ) Notice: Subject to any disclaimer, the term of this patent is extended or adjusted under 35 U.S.C. 154(b) by 594 days.

(21) Appl. No.: 14/765,314

(22) PCT Filed: Feb. 1, 2013

(86) PCT No.: PCT/FR2013/050224
§ 371 (c)(1),
(2) Date: Jul. 31, 2015

(87) PCT Pub. No.: WO2014/118442
PCT Pub. Date: Aug. 7, 2014

(65) Prior Publication Data
US 2015/0367455 A1    Dec. 24, 2015

(51) Int. Cl.
*B23K 10/00* (2006.01)
*B23K 35/30* (2006.01)
(Continued)

(52) U.S. Cl.
CPC ............ *B23K 35/3066* (2013.01); *B22D 7/02* (2013.01); *B23K 9/0282* (2013.01); *B23K 9/23* (2013.01);
(Continued)

(58) Field of Classification Search
CPC .... B23K 35/3066; B23K 9/0282; B23K 9/23; B23K 35/0261; B23K 35/3033;
(Continued)

(56) References Cited

U.S. PATENT DOCUMENTS 3,184,577 A     5/1965   Witherell
2008/0277398 A1  11/2008  Wilson
(Continued)

FOREIGN PATENT DOCUMENTS

DE    19934400 A1   2/2001
EP    0482889 A2    4/1992
(Continued)

OTHER PUBLICATIONS

Yushchenko, K.A., et al., Effect of alloying of the seam metal on the properties of weldments in invar alloys, Metal Science and Heat Treament, Oct. 1, 2974, p. 866-869.
(Continued)

*Primary Examiner* — Mark Paschall
(74) *Attorney, Agent, or Firm* — Knobbe, Martens, Olson & Bear, LLP (57) ABSTRACT

The invention concerns a welding wire intended for use in welding together parts of parts consisting of F3-36Ni alloy. The welding wire consists of an alloy comprising, in wt. %:
$38.6\% \leq Ni+Co \leq 45.0\%$
$trace \leq Co \leq 0.50\%$
$2.25\% \leq Ti+Nb \leq 0.8667 \times (Ni+Co) - 31.20\%$ if $38.6\% \leq Ni+Co \leq 40.33\%$
$2.25\% \leq Ti+Nb \leq 3.75\%$ if $40.33\% \leq Ni+Co \leq 41.4\%$
$0.4167 \times (Ni+Co) - 15.0\% \leq Ti+Nb \leq 3.75\%$ if $41.4\% \leq Ni+Co \leq 45.0\%$
$trace \leq Nb \leq 0.50\%$
$0.01\% \leq Mn \leq 0.30\%$
$0.01\% \leq Si \leq 0.25\%$
$trace \leq C \leq 0.05\%$
$trace \leq Cr \leq 0.50\%$
the rest consisting of iron and inevitable impurities resulting from production.

23 Claims, 2 Drawing Sheets

(51) Int. Cl.
  *B23K 35/02* (2006.01)
  *C22C 38/08* (2006.01)
  *B22D 7/02* (2006.01)
  *B23K 9/028* (2006.01)
  *B23K 9/23* (2006.01)
  *B23K 10/02* (2006.01)
  *C22C 38/00* (2006.01)
  *C22C 38/02* (2006.01)
  *C22C 38/04* (2006.01)
  *C22C 38/44* (2006.01)
  *C22C 38/48* (2006.01)
  *C22C 38/50* (2006.01)
  *C22C 38/52* (2006.01)
  *F16L 9/02* (2006.01)
  *F16L 9/17* (2006.01)
  *C21D 8/06* (2006.01)

(52) U.S. Cl.
  CPC .......... *B23K 10/02* (2013.01); *B23K 35/0261* (2013.01); *B23K 35/3033* (2013.01); *C22C 38/002* (2013.01); *C22C 38/004* (2013.01); *C22C 38/02* (2013.01); *C22C 38/04* (2013.01); *C22C 38/08* (2013.01); *C22C 38/44* (2013.01); *C22C 38/48* (2013.01); *C22C 38/50* (2013.01); *C22C 38/52* (2013.01); *F16L 9/02* (2013.01); *F16L 9/17* (2013.01); *C21D 8/065* (2013.01)

(58) Field of Classification Search
  CPC ......... B22D 7/02; C22C 38/002; C22C 38/02; C22C 38/004; C22C 38/04; C22C 38/08; C22C 38/44; C22C 38/48; C22C 38/50; C22C 38/52
  USPC ............. 219/121.46, 76.15, 76.16, 137 WM, 219/146.23, 146.41
  See application file for complete search history.

(56) References Cited

U.S. PATENT DOCUMENTS

2010/0166594 A1* 7/2010 Hirata .................... C21D 6/001
  420/443
2012/0224992 A1* 9/2012 Cheney .............. B23K 35/3053
  420/114
2014/0083981 A1* 3/2014 Amata .................. B23K 9/173
  219/74

FOREIGN PATENT DOCUMENTS

FR      1363453 A      6/1964
WO   2007/087785 A1   8/2007

OTHER PUBLICATIONS

Corbacho, Jose L., et al., Grain coarsening and boundary migration during welding of invar Fe—36Ni alloy, Materials Characterization, Jan. 1, 1998, p. 27-34.

* cited by examiner

WELDING WIRE FOR FE—36NI ALLOY

CROSS-REFERENCE TO RELATED APPLICATIONS

This application is the U.S. National Phase under 35. U.S.C. § 371 of International Application PCT/FR2013/050224, filed Feb. 1, 2013. The disclosure of which including the specification, the drawings, and the claims is hereby incorporated by reference in its entirety.

This invention concerns a welding wire intended for welding portions of parts, which portions have the following composition in wt. %:

35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50% the rest consisting of iron and inevitable impurities resulting from production.

This composition corresponds to the normal definition of Fe-36Ni alloys.

Fe-36Ni alloys, such as Invar® M93, are alloys with a low thermal expansion coefficient, making them very attractive, in particular for transporting cryogenic liquids.

In such applications, Fe-36Ni elements are assembled by welding.

When assemblies of Fe-36Ni alloy elements are used in pressurised receptacles, e.g., pipes for the transport of cryogenic liquids or tanks for receiving cryogenic liquids, it is desirable for these assemblies to meet the criteria set forth in section IX on qualifications for welds and brazings of the standard entitled Boiler and Pressure Vessel Code of the ASME (American Society of Mechanical Engineers).

This standard requires, in particular, that the mechanical properties of the solder joint, in particular the rupture strength (Rm), be greater than or equal to those of the base metal of which the elements assembled by the solder joint are made, such that the assembly can be dimensioned based on the properties of the base metal and not those of the solder joint.

This property is described by persons skilled in the art as "overmatching" of mechanical properties. It is considered satisfied if, in a traction test on a test piece taken perpendicularly to the solder joint, the rupture occurs in the base metal and not the solder joint.

In this case, the base metal is a Fe-36Ni alloy. Accordingly, the condition of overmatched mechanical properties will be met if the solder joint has mechanical properties greater than or equal to those of the Fe-36Ni alloy.

A weld generally has grains greater in size than those of the base metal, in particular due to the respective processes by which they were obtained. Accordingly, a homogeneous weld, i.e., one made with a welding wire having an identical chemical composition to that of the base metal does not generally meet the condition of overmatching.

In order to improve the mechanical properties of the weld compared to a homogeneous weld, the hardening of the alloy constituting the welding wire by adding alloying elements such as niobium, which lead a solid solution hardening of the alloy, has been considered.

For example, iron-based welding wires comprising 36% nickel, 1.6% niobium, and 0.4% manganese are known. In these welding wires, the niobium is added for its solid solution hardening effect, and the manganese is added to trap the sulphur and improve the resistance to the solidification and reheating crack.

However, the inventors of the present invention have found that such welding wires are not entirely satisfactory when welding together Fe-36Ni alloy parts.

In fact, the inventors found that the addition of niobium, whilst indeed improving the mechanical properties of the weld between the elements made of Fe-36Ni alloy at room temperature, in particular their traction resistance, degraded other properties of the weld. In particular, welds thus obtained are fragile. Thus, the experiments carried out by the inventors have shown that such welds have a ductility at −196° C., measured by impact test (KCV), lower by 80% to that of the base metal.

Furthermore, the inventors also found that these solder joints are more sensitive to martensitic transformation when deformed than the base metal. The presence of martensite islets in an iron-nickel alloy considerably accelerates the pitting corrosion speed. Additionally, it increases its expansion coefficient at cryogenic temperature. A solder joint deformed at cryogenic temperature would thus produce degraded properties compared to that of the base metal. This situation, which is conceivable in an accident, is not, in particular, acceptable in the field of pressurised receptacles, in particular those for the transport or storage of liquefied natural gas.

One objective of the invention is to provide a welding wire suitable for producing welded assemblies in Fe-36Ni alloy that meet the condition of overmatching the mechanical properties of the weld with the Fe-36Ni alloy, and which additionally provide greater safety in applications involving pressurised receptacles.

To this end, the invention concerns a welding wire as described above, made of an alloy comprising, by weight:

38.6%≤Ni+Co≤45.0%
trace≤Co≤0.50%
2.25%≤Ti+Nb≤0.8667×(Ni+Co)−31.20% if 38.6%≤Ni+Co≤40.33%
2.25%≤Ti+Nb≤3.75% if 40.33%≤Ni+Co≤41.4%
0.4167×(Ni+Co)−15.0%≤Ti+Nb≤3.75% if 41.4%≤Ni+Co≤45.0%
trace≤Nb≤0.50%
0.01%≤Mn≤0.30%
0.01%≤Si≤0.25%
trace≤C≤0.05%
trace≤Cr≤0.50% the rest consisting of iron and inevitable impurities resulting from production.

According to particular embodiments, the welding wire according to the invention has one or more of the features of claims 2 to 7, taken alone or in all combinations technically possible.

The invention further concerns a method for producing a welding wire as described above according to claim 8.

According to particular embodiments, the method for producing the welding wire according to the invention has one or more of the features of claims 9 to 12, taken alone or in all combinations technically possible.

The invention further concerns a welding method according to claims 13 and 14.

The invention further concerns a method for producing a pipe section according to claims 15 and 16.

The invention further concerns a method for producing a pipe according to claims 17 and 18.

The invention further concerns a method for producing a tank portion according to claim 19.

The invention further concerns a welded assembly according to claim 20.

The invention further concerns a tank portion according to claim 21.

The invention further concerns a pipe section according to claim 22.

The invention further concerns a pipe according to claim 23.

The invention will be better understood upon reading the following description, made by way of example only, referring to the attached drawings, in which.

The welding wire according to the invention is intended to be used as a filler wire for welding portions of parts made of a base metal comprising in wt. %:

35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50% the rest consisting of iron and inevitable impurities resulting from production.

Such an alloy is a Fe-36Ni alloy. It corresponds to alloy 11 set forth in table 1 of standard ASTM A 333/A333M-99.

Preferably, the welding wire is used to weld together portions of parts made of a base metal comprising in wt. %:

The base metal described above, whether in its general form or its preferred form, has the following properties.

At cryogenic temperature, in particular −196° C. (boling point of nitrogen), its resilience is greater than 100 J/cm$^2$, in particular greater than 120 J/cm$^2$.

It has a low average thermal expansion coefficient between −180° C. and 0° C., in particular of the order of $1 \times 10^{-6}$/° C.

Its martensite content remains below 5% when the metal is subjected to 25% plastic deformation by interrupted flat traction at cryogenic temperature, in particular at −196° C. (boiling point of nitrogen).

The welding wire according to the invention is made of an alloy comprising, in wt. %:

38.6%≤Ni+Co≤45.0%
trace≤Co≤0.50%
2.25%≤Ti+Nb≤0.8667×(Ni+Co)−31.20% if 38.6%≤Ni+Co≤40.33%
2.25%≤Ti+Nb≤3.75% if 40.33%≤Ni+Co≤41.4%
0.4167×(Ni+Co)−15.0%≤Ti+Nb≤3.75% if 41.4%≤Ni+Co≤45.0%
trace≤Nb≤0.50%
0.01%≤Mn≤0.30%
0.01%≤Si≤0.25%
trace≤C≤0.05%
trace≤Cr≤0.50% the rest consisting of iron and inevitable impurities resulting from production.

When the welding wire according to the invention is used as a filler wire to weld together portions of parts made of the base metal as defined above, whether in its particular form or its general form, the welds obtained have the following properties.

The resilience of the weld at cryogenic temperature, in particular at the boiling point of nitrogen (−196° C.) is greater than 120 J/cm$^2$. This property is obtained, in particular, due to the fact that the niobium content of the alloy of which the welding wire consists is less than or equal to 0.50%. This resilience of the weld is similar to that of the base metal.

The average thermal expansion coefficient of the weld between −180° C. and 0° C. is less than $7.5 \times 10^{-6}$/° C. Thus, it is of the order of that of the base metal. This property is obtained, in particular, due to the fact that the titanium+

| Ni | Mn | Si | Co | C | Cr | S | P | Mo | Fe |
|---|---|---|---|---|---|---|---|---|---|
| 35.7% to 36.4% | 0.31% to 0.42% | 0.15% to 0.25% | 0.01% to 0.25% | 0.02% to 0.04% | 0.02% to 0.15% | 0.0002% to 0.0015% | 0.0001% to 0.007% | 0.001% to 0.10% | rest |

The commercial name of this alloy is Invar® M93.

The use of this welding wire does not cause persons skilled in the art to modify the normal conditions for welding.

It should be noted that, throughout this specification, "portions of parts" welded together refers just as much to the case in which the welded portions belong to two initially separate parts as to the case in which the welded portions are two portions of a single part folded on itself, e.g., the two longitudinal edges of a sheet welded to form a pipe.

In the specification below, "cryogenic liquid" refers to a liquefied gas kept in the liquid state at low temperature, in particular below −150° C. Such a cryogenic liquid is, e.g., liquefied methane or natural gas, liquid propane or butane. In the specification below, the boiling point of such a cryogenic liquid is referred to as cryogenic temperature.

niobium content of the alloy of which the welding wire consists is less than or equal to 3.75%.

The cobalt, manganese, silicon, and chromium content of the alloy of which the welding wire consists are limited in order not to degrade the average thermal expansion coefficient between −180° C. and 0° C. beyond $7.5 \times 10^6$/° C.

The weld has a stability to martensitic transformation greater than or equal to that of the base metal at cryogenic temperature (in particular −196° C.), i.e., its martensite content remains less than or equal to 5% when the solder joint is subjected to 25% deformation by interrupted flat traction at cryogenic temperature, in particular −196° C., according to the stability test described below. This good stability of the weld to martensitic transformation is obtained due to the fact that the titanium+niobium content of the welding wire is less than or equal to 0.8667×(Ni+Co)−

31.20%, with Co≤0.50%. In this context, the inventors surprisingly discovered that the stability to martensitic transformation of the weld increases when the nickel+cobalt content of the welding wire increases, with a constant titanium+niobium content and with Co≤0.50%.

The manganese and carbon content of the welding wire also contribute to the improvement of the stability of the weld to martensitic transformation.

The carbon content of the welding wire is limited in order to limit the precipitation of Ti/Nb carbonitrides that degrade resilience at cryogenic temperature.

The mechanical properties of the weld, in particular the rupture strength (Rm), are greater than those of the base metal at room temperature (25° C.). The weld thus meets the condition of overmatching of the mechanical properties at room temperature. This property is obtained due to the fact that the titanium+niobium content of welding wire is greater than or equal to 2.25% with Nb≤0.50%. Titanium and niobium are used for their properties of hardening the solid solution.

The mechanical properties of the weld, in particular the rupture strength (Rm), are greater than those of the base metal at cryogenic temperature. The weld thus meets the condition of overmatching of the mechanical properties at cryogenic temperature. This property is obtained due to the fact that the titanium+niobium content of welding wire is greater than or equal to 0.4167×(Ni+Co)−15.0% with Co≤0.50%.

In particular, the inventors found that, for a given titanium+niobium content, increasing the nickel+cobalt content of the welding wire beyond the upper limit corresponding to the formula above, inverted in order to express the nickel+cobalt content as a function of the titanium+niobium content, i.e., beyond $$\frac{Ti + Nb + 15.0\%}{0.4167},$$

with Co≤0.50% degrades the mechanical properties of the alloy at cryogenic temperature. The mechanical properties of the weld at cryogenic temperature are then inferior to those of the base metal, and the condition of overmatching at cryogenic temperature is no longer met.

It should be noted that the contents of the alloying elements in the welding wire according to the invention take into account the inevitable dilution of the welding wire by mixture with the melted base metal during welding. The average dilution is generally comprised between 15% and 50% depending on the welding technique used.

The three ranges of the titanium+niobium content as a function of the nickel+cobalt content of the alloy of which the welding wire according to the invention consists, defined above in the general composition of the welding wire, result from the combination of the aforementioned conditions.

Figure 1:
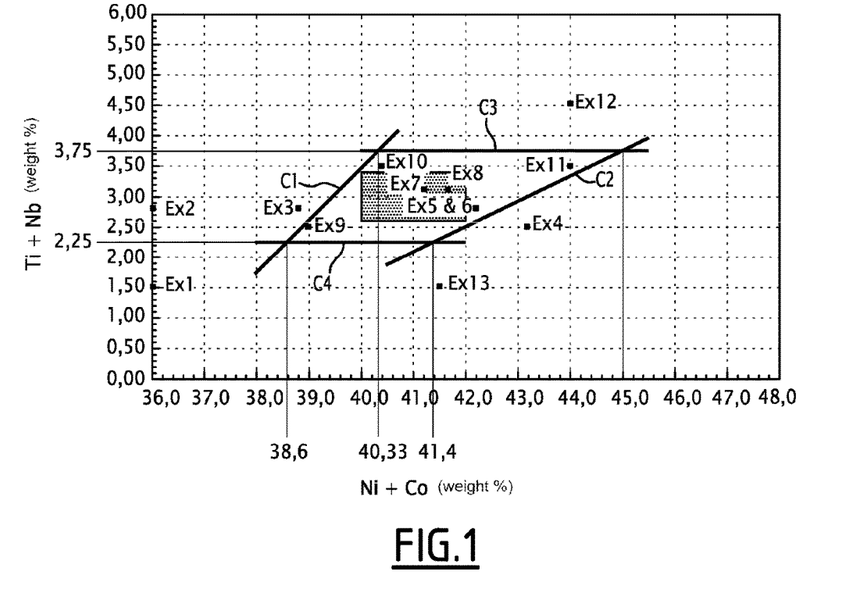
FIG. 1 is a graph representing the titanium+niobium content of the welding wire according to the invention as a function of its nickel+cobalt content.

These ranges are graphically represented in FIG. 1, which is a graph representing the titanium+niobium content as a function of the nickel+cobalt content of the alloy of which the welding wire consists. In this drawing:

the curve marked C1 represents the equation Ti+Nb=0.8667×(Ni+Co)−31.20%;
the curve marked C2 represents the equation Ti+Nb=0.4167×(Ni+Co)−15.0%;
the curve marked C3 represents the equation Ti+Nb=3.75%; and
the curve marked C4 represents the equation Ti+Nb=2.25%.

More specifically:

Curve C1 delimits the range of minimum nickel+cobalt content (with Co≤0.50%) in which the weld obtained from the welding wire has a stability to martensitic transformation at cryogenic temperature greater than or equal to that of the base metal.

Curve C2 delimits the range of maximum nickel+cobalt content (with Co≤0.50%) in which overmatching of the mechanical properties of the weld is obtained at cryogenic temperature.

Curve C3 delimits the range of maximum titanium+niobium content (with Nb≤0.50%) for which the thermal expansion coefficient of the weld, between −180° C. and 0° C., is less than $7.5 \times 10^{-6}/°$ C.

Curve C4 delimits the range of minimum titanium+niobium content (with Nb≤0.50%) in which overmatching of the mechanical properties of the weld is obtained at room temperature.

Additionally, it will be noted that, in the alloy of which the welding wire consists:
- the silicon content greater than or equal to 0.01% ensures the deoxidation of the alloy;
- the chromium content less than or equal to 0.50% improves the resistance of the alloy to atmospheric corrosion;
- the cobalt content less than or equal to 0.50% improves the resilience of the welds.

Preferably, the niobium content of the welding wire is less than or equal to 0.01 wt. % so as to avoid or limit the formation of niobium carbide, which may weaken the weld.

Preferably, the cobalt content of the welding wire is less than or equal to 0.01 wt. % so as to make the weld even less sensitive to martensitic transformation at cryogenic temperature.

Preferably, the carbon content of the welding wire is less than or equal to 0.015 wt. % so as to avoid or limit the volume fraction of carbide of Ti/Nb, which may weaken the weld.

Preferably, the chromium content of the welding wire is less than or equal to 0.10 wt. % so as to further reduce the thermal expansion coefficient of the weld and to make the weld even less sensitive to martensitic transformation.

Even more preferably, the welding wire consists of an alloy comprising, in wt. %:
40.0%≤Ni+Co≤42.0%
2.60%≤Ti+Nb≤3.40%
trace≤Nb≤0.01%
trace≤Co≤0.10%
0.01%≤Mn≤0.10%
0.01%≤Si≤0.10%
trace≤C≤0.015%
trace≤Cr≤0.10%
the rest consisting of iron and inevitable impurities resulting from production.

This preferred composition is represented by a rectangle in FIG. 1.

A welding wire with this composition is particularly advantageous. Indeed, it allows for a very good balance between the various properties of the solder joint formed between the portions of parts made of the base metal, i.e., a resilience (KCV) at −196° C. greater than or equal to 130 J/cm², an average thermal expansion coefficient between −180° C. and 0° C. less than $5 \times 10^{6}/°$ C., a very low sensitivity to martensitic transformation at −196° C., and overmatching of the mechanical properties of the weld with the base metal at −163° C. and 25° C.

It further has improved weldability due to its titanium+niobium content below 3.40%.

Even more preferably, the welding wire has the following composition, in wt. %:

41.0%≤Ni+Co≤42.0%
2.60%≤Ti+Nb≤3.40%
trace≤Nb≤0.01%
trace≤Co≤0.10%
0.01%≤Mn≤0.10%
0.01%≤Si≤0.10%
trace≤C≤0.015%
trace≤Cr≤0.10% the rest consisting of iron and inevitable impurities resulting from production.

This welding wire is particularly advantageous. Indeed, in addition to the aforementioned advantages, the solder joint obtained by welding together portions of parts made of the base metal has even better stability to martensitic transformation. In fact, the martensite content of the solder joint remains less than or equal to 3% when the solder joint is subjected to 25% deformation by interrupted flat traction at cryogenic temperature, in particular at −196° C., according b the stability test described below. Thus, the solder joints obtained between two parts made of the base metal using this welding wire as a filler wire have an even better pitting corrosion resistance. Furthermore, the reduction of the martensite content homogenises the thermal expansion coefficient in the solder joint, and allows for further reduction of the local thermal expansion differences resulting from the presence of martensite.

The invention further concerns a method for producing a welding wire as described above.

This method comprises a step of producing the alloy of which the welding wire consists. The aforementioned alloy is produced in a conventional manner, e.g., in an electric arc furnace or a vacuum induction furnace.

During the production of the alloy of which the welding wire consists, one seeks to reduce as much as possible the content of elements such as sulphur and phosphorus, in particular in order to avoid the alloy having any sensitivity to solidification and reheating crack, thus promoting the hot transformation and the weldability of the welding wire. These residual elements are included amongst the impurities resulting from production.

Once the alloy has been produced, semi-finished products are produced from the alloy. To this end, the alloy is either cast into ingots or directly cast in the form of billets, in particular by means of continuous casting. The semi-finished products obtained at the end of this step are thus advantageously ingots or billets.

Optionally, these semi-finished products are vacuum re-melted or re-melted under electroconductive slag. This step has the effect of reducing the content of undesired residual elements, thus improving the purity of the alloy.

Then, the semi-finished products are hot transformed between 1050° C. and 1250° C. to form a wire.

In particular, during this hot transformation step, the semi-finished products, i.e., in particular the ingots or billets, are hot transformed so as to reduce their cross-section, giving them, e.g., a square cross-section having a side of approximately 100 mm to 200 mm. Thus, a semi-finished product with a reduced cross section is obtained. The length of this semi-finished product is, in particular, comprised between 10 m and 20 m.

Advantageously, the reduction of the cross-section of the semi-finished products is carried out by one or more successive hot-rolling passes.

The semi-finished products with reduced cross-section are then hot transformed again to obtain the wire. The wire may be, in particular, a machine wire. It has, e.g., a diameter comprised between 5 mm and 21 mm, and, in particular, approximately equal to 5.5 mm.

Advantageously, during this step, the wire is produced by hot rolling on a wire mill.

The wire is then descaled, and wound into a coil.

It is then drawn with a known wire-drawing system in order to obtain the welding wire. This welding wire has a diameter less than that of the original wire. Its diameter is, in particular, comprised between 0.5 mm and 1.5 mm. It is advantageously comprised between 0.8 mm and 1.2 mm.

The invention further concerns the use of the welding wire as defined above to weld together at least two portions of parts made of the base metal defined above.

Figure 2:
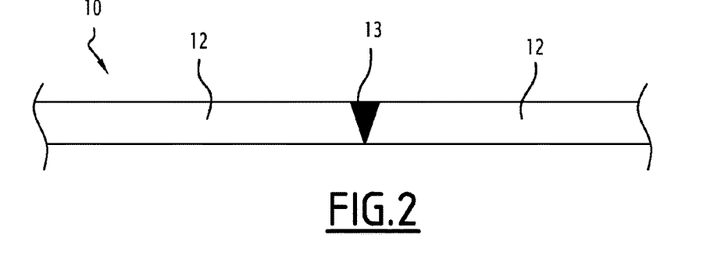
FIG. 2 is a schematic cross-sectional view of a welded assembly according to the invention.

The invention further concerns a welding method to weld together at least two parts of parts 12 in the base metal defined above so as to produce a welded assembly 10 (FIG. 2).

Initially, a welding wire as described above is provided. Portions of parts 12 made of the base metal that are to be welded together using the welding method are also provided.

Then, the portions of parts 12 are welded together using the welding wire as a filler wire.

In this step, e.g., either a lap weld or a butt weld is produced. The choice of the type of weld depends in particular on the nature and shape of the portions of parts 12 to be welded and the desired shape of the welded assembly 10.

The welding step may comprise one or more welding passes. Classically, it comprises a first welding pass called root pass, followed by one or more additional welding passes called filling passes.

Each of the welding passes is carried out using the welding wire according to the invention as a filler wire, as described above. Thus, the dilution of the welding wire is limited to the dilution by the base metal melted as a result of welding.

The weld is produced manually or automatically.

Advantageously, the weld is produced by a low-power welding method, such that the thermally affected area of the portions of parts 12 to be welded is as small as possible. In fact, the coarsening of the metal grains in the thermally affected area causes mechanical weakening of the area; thus, it is important to minimise its size to the extent as much as possible.

The weld is produced, e.g., by plasma or TIG (tungsten inert gas) or MIG (metal inert gas) welding using the welding wire according to the invention as a filler wire.

Preferably, the root pass is carried out with plasma welding, and the filling passes by MIG or TIG welding, advantageously by TIG welding. Indeed, the MIG and TIG welding methods are lower-power welding methods than plasma welding.

At the end of this method, a welded assembly 10 is obtained comprising the portions of parts 12, connected by a weld bead 13 obtained from the welding wire as described above. Such a welded assembly 10 is shown in FIG. 2.

More specifically, this welding method may be used to produce a pipe section made of the base metal as defined above.

Thus, the invention further concerns a method for producing such a pipe section.

Figure 3:
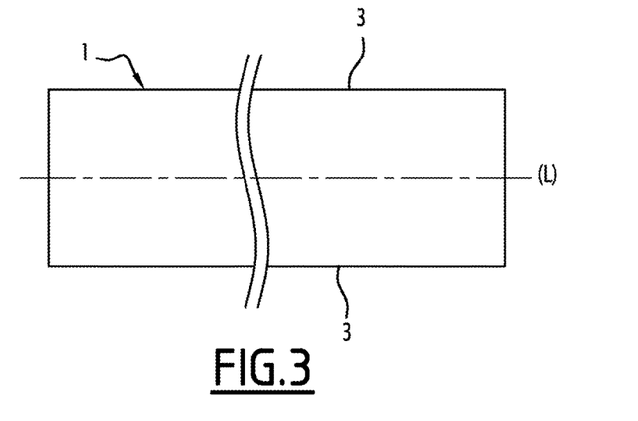
FIG. 3 is a schematic top view of a sheet used in implementing the method for producing a pipe section.

The method comprises the provision of a sheet 1 made of the base metal. Such a sheet is shown in FIG. 3. It extends in a longitudinal direction L, and has longitudinal edges 3 that are substantially parallel to the longitudinal direction L. It has, for example, a thickness comprised between 2 and 18 mm.

The method additionally comprises a step of folding the sheet 1 so as to position the two longitudinal edges 3 opposite one another, followed by a step of welding together the two longitudinal edges 3 positioned facing one another using the welding method described above.

In this case, the portions of parts 12 described when describing the welding method comprise the longitudinal edges 3 of the sheet 1.

The weld produced in this step is a longitudinal weld.

Preferably, it is a butt weld.

Figure 4:
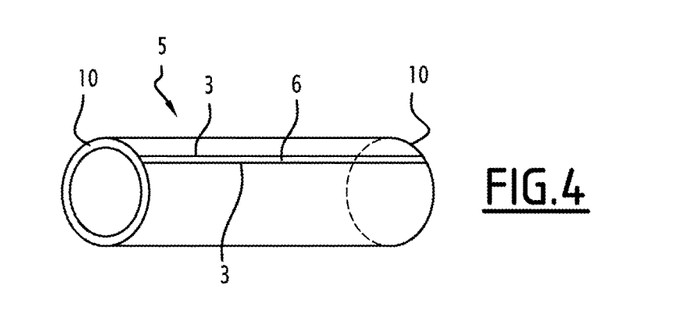
FIG. 4 is a schematic perspective view of a pipe section obtained by the method for producing a pipe section according to the invention.

At the end of this method, a pipe section 5 is obtained as shown in FIG. 4, in which the sheet 1 is folded into a pipe, and the longitudinal edges 3 of the sheet 1 are connected by a weld bead 6 obtained from the welding wire described above.

In one variant, at least the longitudinal edges 3 of the sheet 1 are made of the base metal. The rest of the sheet 1 may be made of any material.

Figure 5:
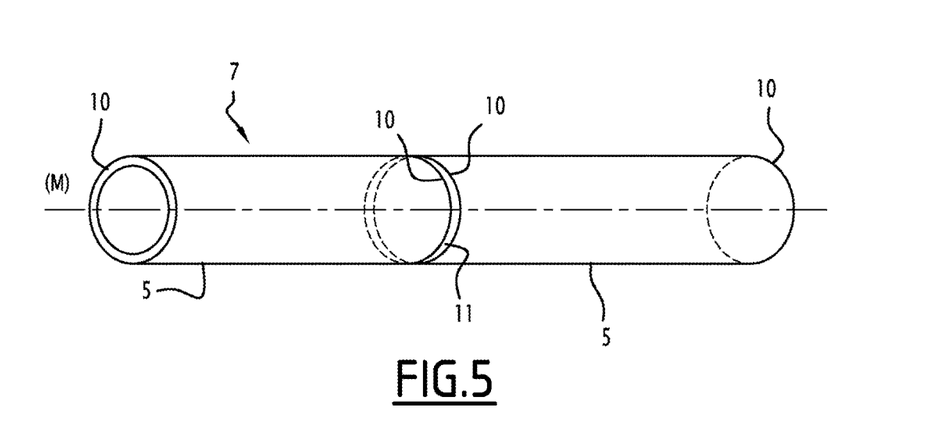
FIG. 5 is a schematic perspective view of a pipe obtained by the method for producing a pipe section according to the invention.

The welding method according to the invention may also be used to produce a pipe 7 from the pipe sections made of the base metal as defined above.

Thus, the invention further concerns a method for producing such a pipe. Such a pipe 7 is shown on FIG. 5.

In this process, at least two pipe sections 5 are provided. These pipe sections are, e.g., the pipe sections 5 obtained using the production method described above.

Each pipe section 5 is substantially cylindrical with an axis M, and has two longitudinal ends 10, spaced along to the direction of the axis M.

The two pipe sections 5 are then positioned such that their longitudinal ends 10 are arranged facing each other along the direction of the axis M of the pipe sections 5, then, the longitudinal ends 10 of the two pipe sections 5 are welded together using the welding method described above.

In this case, the portions of parts 12 defined in the welding method comprise the longitudinal ends 10 of the sections of pipe 5.

Advantageously, in this step, a butt weld is carried out between the longitudinal ends 10 of the pipe sections 5.

When the welding step is carried out in the shop, a circular weld is preferably carried out. A circular weld is, classically, a weld obtained by rotating the pipe sections 5 to be welded relative to the welding tool, in particular relative to the welding torch.

When the welding step is carried out outside of the shop, e.g., at the installation site of the pipe 7, an orbital weld is preferred. An orbital weld is a weld obtained by rotating the welding tool, in particular the welding torches, relative to the pipe sections 5 to be welded.

This welding step is carried out a number of times equal to the number of pipe sections 5 to be welded in order to form the pipe 7 minus one.

In one variant, this method can be carried out with any type of pipe section having its longitudinal ends made of the base metal, regardless of the method of production of the pipe section.

Optionally, a melting line is additionally produced on the reverse side of the weld, i.e., inside the pipe 7. This additional step classically allows for improvement of the geometry of the weld.

At the end of this or these welding steps, the pipe 7 is obtained. This pipe 7 comprises at least two successive pipe sections 5 assembled by a weld bead 11 obtained from a welding wire as described above.

Such a pipe 7 is, e.g., an interior pipe of a conduit for the transport of a cryogenic liquid, in particular a submarine conduit.

Examples of natural gases transported include methane, liquefied natural gas, butane, and liquid propane.

The welding method according to the invention may also be used to produce a tank portion 7 made of the base metal.

The invention thus further concerns a method for producing at least one tank portion made of the base metal defined above by welding together parts made of the base metal.

A tank portion is, e.g., a membrane forming the interior lining of a tank, or a portion of such a membrane.

The parts used are, e.g., previously produced by forming them into sheets. They may also be sheets cut from suitable strips. The sheets used have, e.g., a thickness comprised between 0.2 mm and 10 mm, advantageously comprised between 0.5 mm and 1.5 mm.

The parts are welded together using the welding method as described above.

Thus, a tank, portion comprising at least two parts connected by a weld bead obtained from the welding wire as described above, is obtained.

Such a tank is, e.g., a tank intended to contain a cryogenic liquid, e.g., liquefied natural gas.

EXAMPLES

Welding wires according to the invention were produced using the method for producing the welding wire described above.

Table 1 summarises the experiments conducted.

In this table, the welding wires not consistent with the invention are marked with an asterisk. Thus, in examples 1-4 and 12-14, the chemical composition of the welding wire is not consistent with the invention. In examples 5-11, the chemical composition of the welding wire is according to the invention.

TABLE 1

| Example | Chemical composition of the welding wire by wt. % | | | | | | | | |
|---|---|---|---|---|---|---|---|---|---|
| | Ni | Co | Ti | Nb | Mn | Si | Cr | C | Fe |
| 1* | 36.0 | trace | 1.5 | trace | 0.07 | 0.05 | 0.02 | 0.005 | rest |
| 2* | 36.0 | trace | 2.8 | trace | 0.08 | 0.05 | 0.02 | 0.004 | rest |
| 3* | 38.8 | trace | 2.8 | trace | 0.09 | 0.05 | 0.03 | 0.004 | rest |
| 4* | 43.2 | trace | 2.5 | trace | 0.07 | 0.04 | 0.02 | 0.005 | rest |
| 5 | 42.2 | trace | 2.8 | trace | 0.1 | 0.05 | 0.05 | 0.01 | rest |
| 6 | 42.2 | trace | 2.5 | 0.3 | 0.09 | 0.05 | 0.05 | 0.004 | rest |
| 7 | 41.2 | trace | 3.1 | trace | 0.07 | 0.05 | 0.02 | 0.007 | rest |
| 8 | 41.2 | 0.5 | 3.1 | trace | 0.06 | 0.03 | 0.02 | 0.005 | rest |
| 9 | 39.0 | trace | 2.5 | trace | 0.05 | 0.02 | 0.02 | 0.006 | rest |
| 10 | 40.4 | trace | 3.5 | trace | 0.05 | 0.03 | 0.02 | 0.004 | rest |
| 11 | 43.7 | 0.3 | 3.2 | 0.3 | 0.07 | 0.04 | 0.02 | 0.004 | rest |
| 12* | 44.0 | trace | 4.5 | trace | 0.07 | 0.02 | 0.02 | 0.004 | rest |
| 13* | 41.5 | trace | 1.5 | trace | 0.07 | 0.04 | 0.02 | 0.006 | rest |
| 14* | 41.2 | trace | trace | 3.1 | 0.05 | 0.04 | 0.03 | 0.004 | rest |

The nickel+cobalt and titanium+niobium compositions of the welding wires according to examples 1-13 are shown in FIG. 1. It will be noted that the welding wires according to examples 1-4 and 12 and 13 are outside of the area delimited by curves C1-C4, whilst the welding wires according to examples 5-11 are within this area.

Each of the welding wires according go examples 1-14 was then used to produce a weld between two parts made of a base metal, having a chemical composition as defined in table 2 below, with the contents expressed in wt. %.

TABLE 2

| Ni | Mn | Si | Co | C | Cr | S | P | Mo | Fe |
|---|---|---|---|---|---|---|---|---|---|
| 36.0 | 0.34 | 0.20 | 0.03 | 0.0290 | 0.04 | 0.0005 | 0.0022 | 0.02 | rest |

The welding conditions are usual for the production of welds using the types of welding methods as described above.

The respective properties of the weld obtained with a welding wire according to each of the examples 1-14 were measured. The results of these measurements are summarized in table 3 below.

TABLE 3

| Example | Area of rupture at 25° C. | Area of rupture at −163° C. | Martensite content (%) | Average expansion coefficient of the weld, between −180° C. and 0° C. ($10^{-6}$/° C.) | Resilience (Kcv) at −196° C. (J/cm$^2$) |
|---|---|---|---|---|---|
| 1* | Molten zone | Molten zone | >20% | 1.7 | — |
| 2* | Base metal | Base metal | >30% | 2.3 | — |
| 3* | Base metal | Base metal | >10% | 3.0 | — |
| 4* | Base metal | Molten zone | <5% | 5.4 | 160 |
| 5 | Base metal | Base metal | <5% | 4.9 | 145 |
| 6 | Base metal | Base metal | <5% | 5.0 | 125 |
| 7 | Base metal | Base metal | <3% | 4.5 | 138 |
| 8 | Base metal | Base metal | <3% | 4.6 | 130 |
| 9 | Base metal | Base metal | <5% | 2.6 | 126 |
| 10 | Base metal | Base metal | <5% | 3.6 | 133 |
| 11 | Base metal | Base metal | <5% | 4.2 | 149 |
| 12* | Base metal | Base metal | <5% | 7.9 | — |
| 13* | Molten zone | Molten zone | <5% | 4.4 | 135 |
| 14* | Base metal | Base metal | <5% | 4.4 | 80 |

In the table:

the two first columns indicate the area of the welded assembly in which the rupture occurs in a rupture test under flat traction in accordance with standard ASTM E8, at a temperature of 25° C. and −163° C. respectively.

The third column, entitled "Martensite content", contains the volume fraction of martensite in the weld, measured following deformation of the weld by 25% by interrupted flat plane traction at −196° C. in a liquid nitrogel bath. The results indicated in this column indicate the stability of the weld to the martensitic transformation.

More specifically, in this trial, test pieces are taken perpendicularly to the solder joint, then two micro-hardness imprints are made in the gauge section of the test pieces. The distance between these two imprints was measured before the interrupted traction test in order to obtain a length L0 of the test piece, and after the interrupted traction test so as to obtain a length L1 of the test piece. The plastic deformation generated at −196° C. by the traction machine is calibrated such that the distributed elongation, given by the formula:

$$\frac{L1 - L0}{L1}$$

is comprised between 22.5% and 27.5%. Then, a standard dosage $$\frac{\alpha}{\gamma}$$

is carried out by X-ray diffraction. The volume fraction of martensite (τ%) developed in the gauge section of the test piece deformed at −196° C. is measured by the ratio $$\frac{I(110)}{I(110) + I(111)},$$

where I(111) is the integrated intensity of the austenite peak (111), and I(110) is the integrated intensity of the martensite peak (110).

It should be noted that the martensite content (τ%) of the base metal used, defined in table 3, remains below 5% following a plastic deformation of 25% by traction at −196° C. as defined above.

The fourth column contains the average thermal expansion coefficient of the weld, between −180° C. and 0° C., expressed in $10^6$/° C.

This coefficient was determined by measuring the variation in length in micrometers between −180° C. and 0° C. of a test pipe having a length of 50 mm at 0° C. The average thermal expansion coefficient is obtained applying the following formula:

$$\frac{1}{L_0} \times \frac{L_0 - L_1}{T_0 - T_1}$$

where $L_0$-$L_1$ represents the variation in length in micrometers between 0° C. and −180° C., $T_0$ is equal to 0° C., and $T_1$ is equal to −180° C.

The fifth column contains the impact strength of the weld (Kcv), measured in accordance with standard NF EN 10045-1. This impact strength is expressed in J/cm². It indicates the resilience of the weld.

Table 3 shows that the welds obtained using welding wires according to examples 5 to 11 have all of the desired characteristics described above by reference to the composition of the welding wire.

Indeed, in each of these examples, the rupture occurs in the base metal, and not in the molten zone, both at room temperature (25° C.) aid cryogenic temperature (−163° C.). These results show that the mechanical properties of the molten zone, i.e., the weld, are greater than those of the base metal (overmatching of mechanical properties), both at room and cryogenic temperature. It is thus possible to dimension the welded assembly taking into account only the properties of the base metal.

To the contrary, in examples 1 and 13, which are not consistent with the invention, in which the titanium+niobium content of the welding wire is equal to 1.5%, and thus lower than 2.25%, the rupture occurs in the molten zone at room temperature. Thus, there is no overmatching of the mechanical properties at room temperature in this case.

In example 4, which is not consistent with the invention, the nickel+cobalt content of the welding wire is within the range according to the invention, but the titanium+niobium content is less than the minimum obtained by application of the formula 0.4167×(Ni+Co)−15.0%, which is 3.01%. In other terms, for the titanium+niobium content of the wire according to example 4, the nickel+cobalt content is greater than the maximum defined by the curve C2. It can be seen that the rupture of the welded assembly occurs in the molten zone at cryogenic temperature. Thus, there is no overmatching of the mechanical properties at cryogenic temperature in this case.

In example 13, which is not consistent with the invention, the titanium+niobium content is below the minimum defined by the ratio 0.4167×(Ni+Co)−15.0%, which is 2.31%. In other terms, for the titanium+niobium content of the wire according to example 13, the nickel+cobalt content is greater than the maximum defined by the curve C2. It can be seen that the rupture of the welded assembly occurs in the molten zone at cryogenic temperature. Thus, there is no overmatching of the mechanical properties at cryogenic temperature.

For examples 5 to 11, which are consistent with the invention, the martensite content (τ%) following a 25% traction deformation at −196° C. is less than 5%. Thus, the stability to martensitic transformation of the weld according to examples 5 to 11 is at least equal to that of the base metal used.

In examples 1 to 3, in which the nickel+cobalt content of the welding wire is less than the minimum according to the invention, delimited by the curve C1 for the respective Ti+Nb content of these wires, it is also seen that the martensite content following a 25% deformation at −196° C. is much greater than 5%. Thus, the stability to martensitic transformation of the weld according to examples 1 to 3 is strictly less than that of the base metal used.

Additionally, in each of examples 5 to 11, an average thermal expansion coefficient of the weld was measured that was less than $7.5×10^{-6}/°$ C., i.e., close to that of the base metal.

In example 12, which is not consistent with the invention, the titanium+niobium content of the welding wire is greater than 3.75%. It is noted that the average thermal expansion coefficient of the weld obtained with the welding wire according to example 12 is greater than $7.5×10^{-6}/°$ C.

It is seen that, in examples 5 to 11, the impact strength of the test piece at −196° C. (temperature of liquid nitrogen) is greater than 120 J/cm². Thus, the weld produced using the welding wire according to examples 5 to 11 has elevated ductility, consistent with the desired ductility, which limits the risks of fragile rupture of the weld.

Lastly, the welding wire according to example 14, which is not consistent with the invention, has a niobium content greater than 0.50%. It can be seen that the weld obtained using this wire has low ductility at cryogenic temperature, as its resilience is equal to 80 J/cm² à −196° C. The weld thus formed istherefore fragile.

The assemblies of Fe-36Ni alloy parts welded together using the welding wire according to the invention are particularly advantageous.

Indeed, due to the overmatching of the mechanical properties of the weld at room and cryogenic temperature, the assembly may be dimensioned based on the properties of the base metal, not taking into account the properties of the solder joint.

Additionally, the improvement of the mechanical characteristics of the solder joints, due to the use of the welding wire according to the invention, very significantly improves the fatigue resistance of the welds at cryogenic temperature. Fatigue tests carried out in flat alternating traction on prismatic test pieces machined perpendicularly to the welds, with a traction ratio of R=0.1 (ratio between maximum and minimum force), show an increase in the lifetime by a factor of 10 and a more than 30% increase of the maximum force at rupture up to 500,000 cycles of the solder joints obtained with the welding wire according to the invention compared to the solder joints obtained with known Fe-36Ni alloy solder joints.

Furthermore, the solder joint has a low average thermal expansion coefficient, close to that of the base metal, which is advantageous when the assembly is intended to contain a cryogenic liquid. The adaptation of the thermal expansion coefficients between the base metal and the weld attenuates the residual constraints within the welds, and therefore increases their fatigue resistance, in particular when the temperature varies during the loading or unloading phases of the cryogenic liquid.

Furthermore, due to the improved ductility of the solder joint, the risk of fragile rupture of the assembly at the solder joint in the event of an accident, in particular in the case of an impact, is limited. This improved ductility thus allows, in particular, for repairing any leaks resulting from fissures at the solder joint before they propagate. The solder joint obtained using the welding wire according to the invention thus complies with the known "leak before break" specification.

Lastly, the higher nickel and titanium content and the stability of the solder joint to martensitic transformation allow for reduction of the atmospheric corrosion speed of the solder joints obtained using the welding wire according to the invention compared to solder joints obtained with known Fe-36Ni alloy welding wires.

What is claimed is:

1. Welding wire intended to be used for welding together portions of parts, which portions have the following composition in wt. %:

$35.0\% \leq Ni \leq 37.0\%$
$trace \leq C \leq 0.10\%$
$trace \leq Mn \leq 0.60\%$
$trace \leq P \leq 0.025\%$
$trace \leq S \leq 0.025\%$
$trace \leq Si \leq 0.35\%$ trace≤Cr≤0.50%
trace≤Mo≤0.50%
trace≤Co≤0.50%
the rest consisting of iron and inevitable impurities resulting from production,
wherein the welding wire is made in an alloy comprising, in wt. %:
38.6%≤Ni+Co≤45.0%
trace≤Co≤0.50%
2.25%≤Ti+Nb≤0.8667×(Ni+Co)−31.20% if 38.6%≤Ni+Co≤40.33%
2.25%≤Ti+Nb≤3.75% if 40.33%≤Ni+Co≤41.4%
0.4167× (Ni+Co)−15.0%≤Ti+Nb≤3.75% if 41.4%≤Ni+Co≤45.0%
trace≤Nb≤0.50%
0.01%≤Mn≤0.30%
0.01%≤Si≤0.25%
trace≤C≤0.05%
trace≤Cr≤0.50%
the rest consisting of iron and inevitable impurities resulting from production.

2. Welding wire according to claim 1, wherein the niobium content of the welding wire is less than or equal to 0.01 wt. %.

3. Welding wire according to claim 1, wherein the cobalt content of the welding wire is less than or equal to 0.10 wt. %.

4. Welding wire according to claim 1, wherein the carbon content of the welding wire is less than or equal to 0.015 wt. %.

5. Welding wire according to claim 1, made in an alloy comprising, in wt. %:
40.0%≤Ni+Co≤42.0%
2.60%≤Ti+Nb≤3.40%
trace≤Nb≤0.01%
trace≤Co≤0.10%
0.01%≤Mn≤0.10%
0.01%≤Si≤0.10%
trace≤C≤0.015%
trace≤Cr≤0.10%
the rest consisting of iron and inevitable impurities resulting from production.

6. Welding wire according to claim 1, made in an alloy comprising, in wt. %:
41.0%≤Ni+Co≤42.0%
2.60%≤Ti+Nb≤3.40%
trace≤Nb≤0.01%
trace≤Co≤0.10%
0.01%≤Mn≤0.10%
0.01%≤Si≤0.10%
trace≤C≤0.015%
trace≤Cr≤0.10%
the rest consisting of iron and inevitable impurities resulting from production.

7. Welding wire according to claim 1, the diameter of which is comprised between 0.5 mm and 1.5 mm.

8. Method for producing a welding wire according to claim 1, comprising the following steps:
provision of a semi-finished product made of an alloy having the composition of the welding wire according to claim 1;
hot transformation of the semi-finished product to form a wire; and
transformation of the wire into a welding wire having a diameter smaller than that of the wire, said transformation comprising a drawing step.

9. Method of production according to claim 8, in which the transformation of the wire into a welding wire comprises the descaling of the wire and the winding of the descaled wire into a coil, whereby the drawing step consists in drawing the descaled wire wound into a coil.

10. Method of production according to claim 8, wherein the semi-finished product is a billet or an ingot.

11. Method of production according to claim 8, wherein the wire has a diameter comprised between 5 and 21 mm.

12. Method of production according to claim 8, wherein the hot transformation of the semi-finished product to form the wire comprises the hot rolling of the semi-finished product to reduce its cross-section and the hot rolling of the semi-finished product having a reduced section to form the wire.

13. Method for welding together at least two portions of parts, which portions have the following composition in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities resulting from production, comprising the following successive steps:
providing a welding wire according to claim 1, and
welding together the two portions of parts using the welding wire as a filler wire.

14. Welding method according to claim 13, in which all welding passes are carried out using the welding wire according to claim 1 as a filler wire.

15. Method for producing a pipe section, comprising the following steps:
providing a sheet having two longitudinal ends and made of a base metal comprising, in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities resulting from production; and
welding together the longitudinal ends of the sheet using the welding method according to claim 13 to form the pipe section.

16. Method for producing a pipe section according to claim 15, wherein the weld between the longitudinal ends of the sheet to form the pipe section is a longitudinal butt weld.

17. Method for producing a pipe, comprising the following successive steps:
providing a first pipe section and a second pipe section, each extending along a longitudinal axis, and made of a base metal comprising, in wt. %:
35.0%≤Ni≤37.0%
trace≤C≤0.10%
trace≤Mn≤0.60%
trace≤P≤0.025%
trace≤S≤0.025% trace≤Si≤0.35%
trace≤Cr≤0.50%
trace≤Mo≤0.50%
trace≤Co≤0.50%
the rest consisting of iron and inevitable impurities resulting from production;
positioning the first and second pipe sections such that a longitudinal end of the first pipe section is arranged facing a longitudinal end of the second pipe section along the longitudinal axis of the first and second pipe section; and
welding together two longitudinal ends of the first and second pipe sections using the welding method according to claim 13 to form the pipe.

18. Method for producing a pipe according to claim 17, wherein the weld between the longitudinal ends of the first and second pipe sections is a circular butt weld or an orbital butt weld.

19. Method for producing a portion of a tank intended to contain a cryogenic liquid, comprising the following steps:
providing parts, which may be formed into a shape, each made of a base metal comprising, in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities resulting from production; and
welding together these parts using the welding method according to claim 13 to form the tank portion.

20. Welded assembly comprising a first portion of a part and a second portion of a part, each made of a base metal comprising, in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities resulting from production, wherein the first and second portions of parts are connected by a weld bead obtained from the welding wire according to claim 1.

21. Portion of a tank comprising parts made of a base metal comprising, in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities from production, connected by weld beads obtained from the welding wire according to claim 1.

22. Pipe section comprising a sheet folded in the shape of a tube and made of a base metal comprising, in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities resulting from production, and having longitudinal edges connected by a weld bead obtained from the welding wire according to claim 1.

23. Pipe comprising at least two pipe sections, each made of a base metal comprising, in wt. %:
35.0%≤Ni≤37.0%
trace≤C≤0.10%
trace≤Mn≤0.60%
trace≤P≤0.025%
trace≤S≤0.025%
trace≤Si≤0.35%
trace≤Cr≤0.50%
trace≤Mo≤0.50%
trace≤Co≤0.50%
the rest consisting of iron and inevitable impurities resulting from production,
two successive pipe sections being connected by a weld bead obtained from the welding wire according to claim 1.

* * * * *